United States Patent [19]
Dickey et al.

[11] Patent Number: 5,816,057
[45] Date of Patent: Oct. 6, 1998

[54] HORIZONTAL CROSS FLOW FILTRATION AND RINSING OF ICE FROM SALINE SLURRIES

[75] Inventors: Leland C. Dickey, Blue Bell; Michael F. Dallmer, Philadelphia; E. Richard Radewonuk, Woodlyn, all of Pa.

[73] Assignee: The United States of America as represented by the Secretary of Agriculture, Washington, D.C.

[21] Appl. No.: 722,824

[22] Filed: Sep. 27, 1996

[51] Int. Cl.$^6$ .......................................... B01D 9/04
[52] U.S. Cl. .................... 62/123; 62/532; 62/541
[58] Field of Search ................... 62/123, 532, 541, 62/542

[56] References Cited

U.S. PATENT DOCUMENTS

| | | | |
|---|---|---|---|
| Re. 23,810 | 3/1954 | Schmidt | 62/542 |
| 3,012,409 | 12/1961 | Ashley | 62/542 |
| 3,069,864 | 12/1962 | Crosby | 62/542 X |
| 3,093,975 | 6/1963 | Zarchin | 62/542 |
| 3,121,626 | 2/1964 | Zarchin | 62/123 |
| 3,170,779 | 2/1965 | Karnofsky | 62/123 X |
| 3,202,283 | 8/1965 | Liu | 62/123 X |
| 3,232,218 | 2/1966 | Soussloff et al. | 62/123 X |
| 3,339,372 | 9/1967 | Cottle | 62/123 X |
| 3,563,891 | 2/1971 | Richter . | |
| 3,803,861 | 4/1974 | Ganiaris | 62/123 |
| 3,827,248 | 8/1974 | Graniaris | 62/123 |
| 3,879,956 | 4/1975 | Ganiaris | 62/123 |
| 3,992,170 | 11/1976 | Karnofsky | 62/123 X |
| 4,368,119 | 1/1983 | Wilson . | |
| 4,438,634 | 3/1984 | Merle et al. . | |
| 4,475,355 | 10/1984 | Thijssen et al. | 62/123 |
| 4,551,339 | 11/1985 | Olson | 62/541 X |
| 4,666,484 | 5/1987 | Shah et al. | 62/532 |
| 4,830,645 | 5/1989 | Ghodsizadeh et al. | 62/541 |
| 5,059,228 | 10/1991 | Cheng | 62/532 |
| 5,060,483 | 10/1991 | Heiland et al. | 62/123 |

OTHER PUBLICATIONS

Brian, P.L.T., "Engineering for Pure Water Part 2: Freezing", Mechanical Engineering, 90: 42–50 (1968).
Campbell et al., "Viscosity of Concentrated Suspensions: An Approach Based on Percolation Theory", Physical Review A, 41: 4570–4573 (1990).
Dickey et al., "Determining Ice Content of a Fine Ice Slurry from Density Measurements", AlChE J., 35: 2033–2036 (1989).
Dickey et al., "Freeze Concentration of Liquid Foods", Physical Chemistry of Food Processors: Advanced Techniques, Structures and Applications, 2: 542–551 (1983).
Dickey et al., "Low Temperature Concentration of Skim Milk by Direct Freezing and Vacuum Evaporation", Journal of Dairy Science, 78: 1369–1376 (1995).
Grossman, G. "Melting, Freezing and Channeling Phenomena in Ice Counterwashers", AlChEJ., 22: 1033–1042 (1976).

(List continued on next page.)

*Primary Examiner*—Christopher Kilner
*Attorney, Agent, or Firm*—M. Howard Silverstein; John Fado; Janelle S. Graeter

[57] ABSTRACT

The invention provides a filter for removing liquid from an ice slurry. The filter includes a horizontal filter plate. The ice slurry is passed over the top of the filter plate. The filter includes a first stage where the liquid is removed from the ice slurry, thereby consolidating the ice particles into an ice bed. The liquid is removed by drawing the liquid out of the ice slurry through a set of slots in the filter plate by using a low suction pump. A second stage of the filter draws the remaining liquid entrained in the ice bed through another set of slots using a vacuum pump, which has a higher suction than the low suction pump used in the first stage. A clean water rinse may be sprayed on the ice bed in the second stage to improve the removal of liquid from the ice bed. The filter plate at the second stage may be heated to produce a rinse through the bottom of the ice bed.

19 Claims, 7 Drawing Sheets

OTHER PUBLICATIONS

Hoffmann, R.L., "Interrelationships of Particle Stucture and Flow in Concentrated Suspensions", MRS Bulletin, 16: 32–37 (1991).

Hoffman, R.L., Structure Formation in Flowing Suspensions, Applied Sciences, 138: 151–165 (1987).

Jansens, P.J. et al., "Compressive Stresses and Transport Forces in Hydraulic Packed Bed Wash Columns", Chemical Enigeering Science, 49: 3535–3543 (1994).

Mackley, M.R. and N.E. Sherman, "Cross–flow Cake Filtration Mechanisms and Kinetics", Chem. Engng. Sci., 47: 3067–3084 (1992).

Mudani, A.A. et al., "A Combined ROI Freezing Syste to Reduce Inland Rejected Brine Desalination", 75: 241–258 (1989).

Sudduth, R.D., "A New Method to Predict the Maximum Packing Fraction and the Viscosity of Solutions with a Size Distribution of Suspended Particles II", Journal of Applied Polymer Science, 48: 37–55 (1993).

HORIZONTAL CROSS FLOW FILTRATION AND RINSING OF ICE FROM SALINE SLURRIES

BACKGROUND OF THE INVENTION

1. Field of the Invention

Clean water is in increasingly short supply. While large scale desalination processes have been developed and plants have been constructed to supply millions of gallons of clean water daily, there remains a need for plants that can inexpensively supply smaller amounts of clean water. In addition, in many geographic locations, cleaning contaminated water is as important as separating clean water from brine. The invention relates to a system for the continuous filtration of ice slurries to produce clean water as well as potable water.

2. Description of Related Art

Reverse osmosis plants, which are often installed in units of only a few $m^3/d$ (cubic meters per day), are the most widely used type of small water plant today. In addition, investigations into freeze desalination were funded by the Office of Saline Water in the 1960's; however, the equipment costs were too high to make the process competitive with distillation. Further, it was found that water sources (or feeds) having a lower salinity than seawater (such as reclaimed contaminated water) are more amenable to freeze desalination because the freezing temperature is not as low, and thus it requires less expensive equipment to achieve freezing. Where both a seawater feed and a reclaimable contaminated water feed are available, a blend of the two feeds can provide flexibility in production quantities and cost which are not available with single, uncontrollable feed sources.

For large scale freeze desalination plants, capital costs can be reduced because investments in energy recovery equipment, such as heat exchangers and fluid transfer loops for transferring heat between the ice and freezer, are justifiable. However, in small plants, the capital cost of energy recovery equipment is usually greater than can be justified. Additionally, in a small plant, heat generated from the freezing process cannot be efficiently transferred to the ice during a final melting step.

Some beverage concentration techniques use ice slurry filtration; however, these techniques cannot effectively be used to produce potable water. The most widely used commercial ice filtration method for beverage concentration is as follows: an ice/concentrate slurry is pumped to the bottom of a vertical column; the ice is pumped at high pressure upward through a pool of rinse water, while the concentrate is drawn off through the bottom of the column (Brian, P.L.T. 1968. *Engineering for Pure Water Part 2: Freezing, Mechanical Engineering*. vol. 90, pp. 42–50) through perforations in the wall of the column or through internal perforated tubes. The ice that rises to the top of the vertical column is continuously scraped off at its top surface by a rotating blade. Concentrate production rates are limited by the rate of permeation of a rinse water through filters that have pores that are partly occluded by frozen rinse water, the small size of the ice crystals, and the liquid viscosity (Grossman, G. 1962. *AIChEJ*. vol. 22, pp. 1033–1042).

Small, direct freezers have been used to produce milk concentrate. In these small direct freezer plants, the water in the milk freezes into ice particles forming ice milk slurries. When the ice particles are filtered out of the slurry, the milk concentrate remains (Dickey et al. 1995. *Journal of Dairy Science*. vol. 78, pp. 1369–1376). This technique is not suitable for producing water, however, since ice slurry filtration for water production requires more thorough liquid removal than for milk production, assuming the dilute coproduct ice remaining from milk can be disposed of easily.

Another type of ice slurry technique, used to produce fruit juice concentrates, is a batch filtration technique (Merle et al., U.S. Pat. No. 4,438,634). In simple batch filtration, fruit juice in a fruit juice slurry percolates through an ice bed formed from ice crystals or ice particles which are larger than about 80 microns and have been screened or sieved from the fruit juice ice slurry. In contrast to fruit juice, however, the cost of retaining enough of the ice bed to achieve potable qualities of ice from most feed water is too high. Therefore, this technique is not particularly suitable for producing clean water.

Filtering by flowing ice slurries between concentric tubes has also been contemplated for use in water filtration systems. An annular suspension fluid treatment design (described in Wilson, U.S. Pat. No. 4,368,119) has the advantage of a thin particle layer formed in the annulus which can be filtered and rinsed more rapidly than a thicker ice plug. Although the symmetry of the annular design promotes bed uniformity in the circumferential direction perpendicular to both ice flow and filtrate flow, and drag on the moving ice associated with channel edges is reduced; the ice layer thickness is difficult to change and rinsing the ice is complicated. To fill the annular space evenly, the tube assembly must be vertical, thus adding the weight of the ice to the flow resistance. It is also difficult to construct a tube assembly that is sufficiently concentric to avoid passage constriction downstream from the point of ice slurry consolidation.

Thus, the need exists for a small scale, direct freeze filtration system that can achieve the extent of ice slurry liquid removal needed to economically produce potable water, while controlling ice bed thickness and minimizing ice buildup in drainage slots.

SUMMARY OF THE INVENTION

The invention provides an apparatus and a method for the continuous filtration of ice slurries to produce clean water and/or potable water. In the filtration process, an ice slurry is driven through a stationary horizontal channel with liquid draining through narrow slots in the base of the channel. Most of the liquid is drained from the ice slurry under ambient or low pressure to form a consolidated ice bed. The residual liquid trapped in the pores of the consolidated ice bed is rinsed with water from the ice bed and is displaced from the ice bed by a vacuum. The fraction of ice melted, or the equivalent product lost by rinsing, and the fraction of liquid removed by the vacuum depend slightly on the extent of ambient pressure filtration. The rinse water can be sprayed on the top of the ice bed or created by heating the bed and melting some of the ice particles in the ice bed to create liquid water. Spraying or melting techniques can be used alone or in combination with each other.

The filtration system includes a housing, preferably elongated, having a feed inlet at a first end of the housing and an outlet at a second end of the housing opposite to the first end. The ice slurry is introduced into the housing through the feed inlet. A filter plate disposed in the housing extends from the first end of the housing to the second end of the housing. The filter plate has a first portion with a first set of slots and a second portion with a second set of slots. The ice slurry passes over a top side of the filter plate and over the first and second sets of slots. A first pump having a first suction is disposed at the first portion of the channel adjacent to a bottom surface of the filter plate. The first pump is used to induce a first flow path through the first set of slots from the top side of the channel to the bottom side of the channel. A second pump having a suction greater than the first pump is disposed at the second portion of the filter plate to induce liquid flow through the channel where the second set of slots are in the filter plate. A heater is provided to heat the second portion of the filter plate.

The method of the invention includes the steps of: a) pumping a liquid-ice slurry from a freezer into a filter comprising a first filter section and a second filter section; b) filtering a first portion of the liquid from the ice slurry by passing the ice slurry through the first set of slots, thereby forming a consolidated ice bed; c) rinsing the ice bed; and d) filtering substantially all of the remaining liquid from the ice bed as the ice bed passes over the second set of slots.

The invention is advantageous in that it a) expediently and inexpensively produces clean water and, more particularly, potable water; b) by heating the second part of the filter it eliminates clogged drainage slots in a filter plate; c) it provides two-stage removal of fluid from the ice particles in the ice bed, allowing the ice bed structure to be controlled in the first stage; and d) it provides a rectangular channel filter with a relatively thin ice sheet thickness that is simpler, and thus less expensive, than an annular suspension filtration device.

BRIEF DESCRIPTION OF THE DRAWINGS

The present invention is described with reference to the accompanying drawings. In the drawings, like reference numbers indicate identical and functionally similar elements.

DETAILED DESCRIPTION OF THE INVENTION

Figure 1:
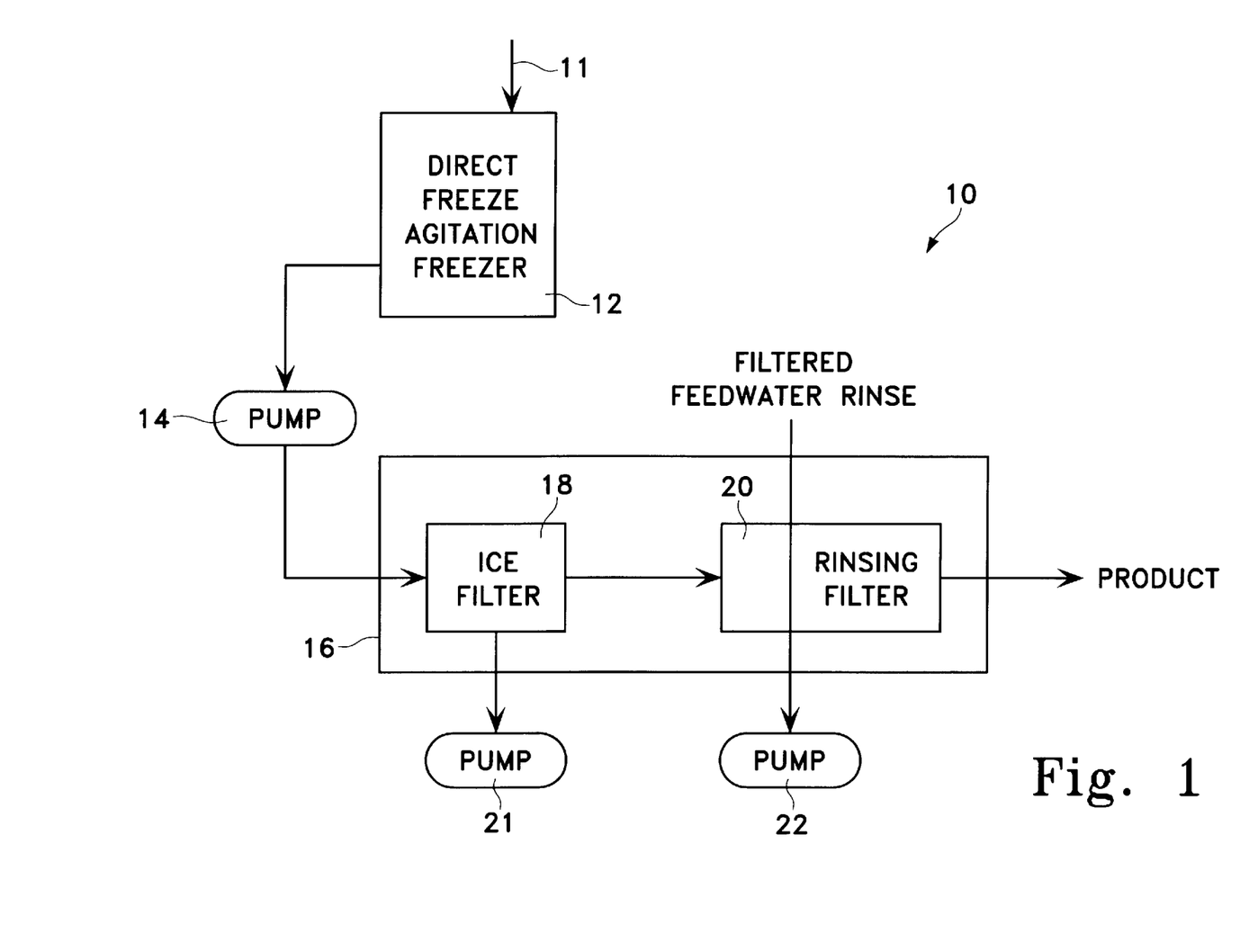
FIG. 1 shows a schematic diagram of ice slurry filtration in accordance with the present invention.

A direct freeze desalination system shown generally at 10 in FIG. 1 is provided. All dimensions included are effective for the system as described; however, it is understood that the dimensions may vary according to particular requirements. System 10 is used for continuously filtering sea water and/or contaminated water to produce clean water for residential and agricultural use, as well as to produce potable water. System 10, generally, includes a freezer 12 and a filter 16. Freezer 12 and associated equipment are used in accordance with conventional techniques. Freezer 12 produces an ice slurry. To do so, a feed solution shown by arrow 11 is input into freezer 12. Feed solution 11 comprises sea water and/or contaminated water. A slurry mass in freezer 12 is maintained by pumping feed solution 11 at a rate controlled by a sensor (not shown) sensitive to or responsive to the pressure difference between the top and bottom of freezer 12. The ice slurries are produced from feed solution 11 by continuously using freezer 12 to create ice particles by evaporative chilling at the slurry triple point. The ice particles produced may vary in size. A freezer that produces medium size ice particles having a diameter between 50 and 100 microns may be used. The ice slurry produced by freezer 12 includes a mixture of ice particles and liquid to be filtered, such as saline or contaminated liquid, and the composition of the ice slurry may vary depending upon the composition of feed solution 11. For purposes of example only, however, an ice slurry of ice particles and saline will be discussed.

The ice slurry produced by freezer 12 is continuously pumped out of the bottom side of freezer 12 by a progressing cavity pump 14, which serves to seal and maintain a vacuum in freezer 12. Progressing cavity pump 14 supplies the force to drive the ice slurry from freezer 12 into and through filter 16 of the present invention. Filter 16 includes two stages. Stage one is an ice filter 18 and stage two is a rinsing filter 20. The ice slurry is first passed through ice filter 18 where liquid (such as saline) is filtered from the ice slurry using a low suction and low flow-rate pump 21 or drains to ambient pressure, in which case the liquid pressure supplied by the pump 14 drives out the liquid. For simplicity, both types of removal are referred to herein as ambient filtration. At ice filter 18, approximately 70–90% of the liquid in the ice slurry is removed from the ice slurry. By filtering out this liquid through ice filter 18, the ice particles in the ice slurry are consolidated into a porous, consolidated ice slurry or ice bed.

The liquid remaining in the ice bed is removed by pushing the bed through rinsing filter 20. At rinsing filter 20, the ice bed is rinsed by: 1) use of a vacuum pump 22 (discussed below with reference to FIG. 2) that draws air through the ice bed at a relatively high air flow rate, thereby dragging out liquid entrained in the ice bed; 2) use of a sprayer 44 (discussed below with reference to FIG. 2) to spray a filtered feedwater rinse through the ice bed to displace the remaining liquid from finer pores and substantially rinse and displace liquid, which is then removed from the ice bed by vacuum pump 22; and/or 3) melting some of the ice particles in the ice bed by heating a filter plate 28 (discussed below with reference to FIG. 2) on which the ice bed is transported through rinsing filter 20. This melting produces water which will assist in flushing out of the ice bed the liquid remaining in the ice bed. In addition, the heating of filter plate 28 causes a thin portion of the lower surface of the ice bed to melt. This is advantageous because this thin portion of the lower surface of the ice bed is the most contaminated portion of the ice bed due to the continuous downward drainage of the saline from the top of the ice bed to the bottom of the ice bed in the first stage 18. An ice product produced by filter 16 is of a sufficient quality for use as potable water. The extent of the filtering may be reduced if the water has a different use, such as agricultural.

Figure 2:
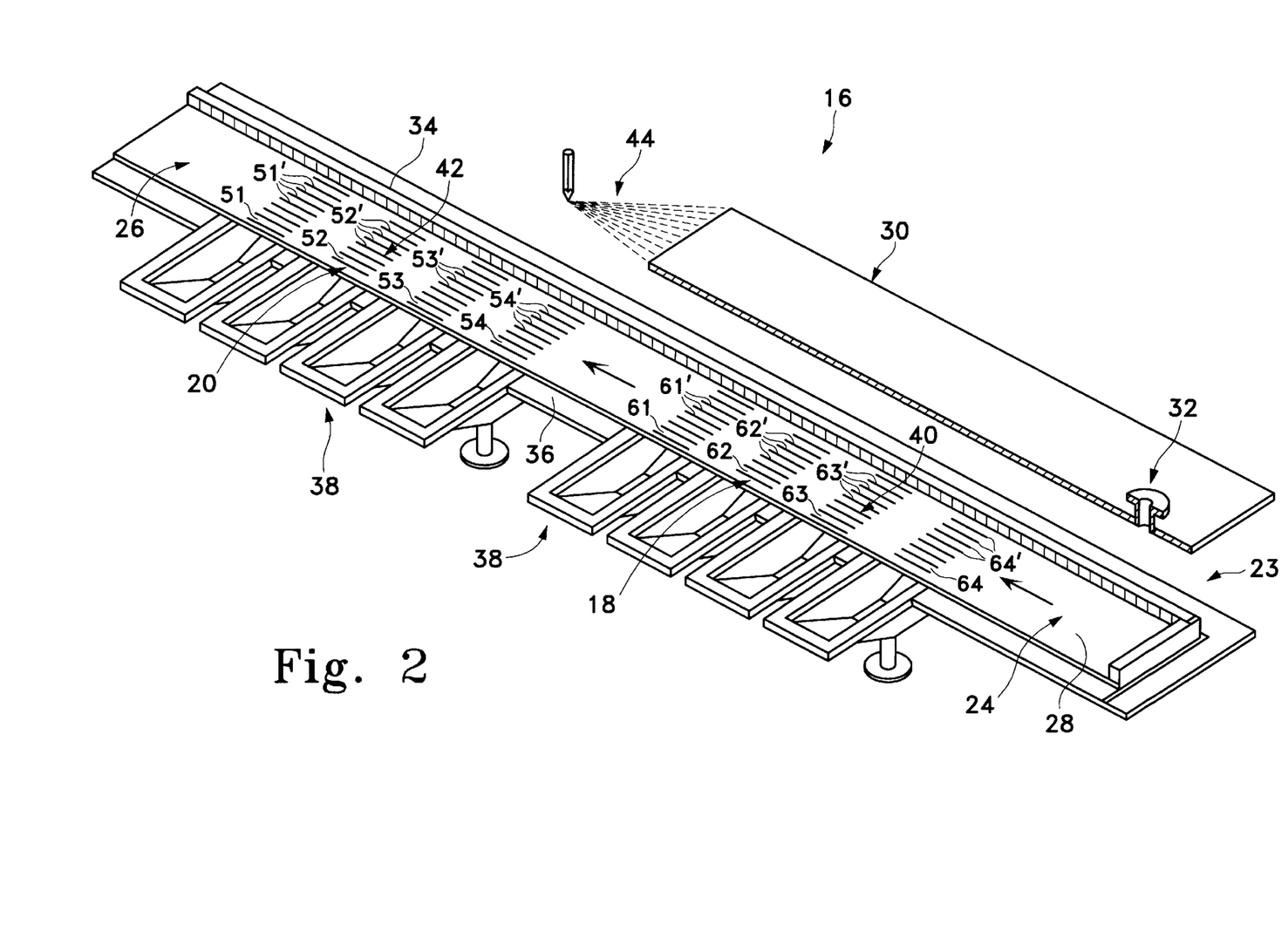
FIG. 2 shows a horizontal filter in accordance with the present invention.

Referring now to FIG. 2, an embodiment of filter 16 is shown. Filter 16 is positioned in a substantially horizontal and fixed position. Filter 16 has a housing 23 of a generally flat, elongated, channel-type construction made of steel. Housing 23 has an input end 24 and an output end 26. Input end 24 is substantially closed and output end 26 is open for discharging the ice bed. An effective housing 23 is approximately about 23 cm wide and about 125 cm long.

A top plate 30 of housing 23 includes an inlet 32 at input end 24 for continuously receiving the ice slurry from freezer 12. Inlet 32 is connected to freezer 12 by a hose having a diameter of approximately 3.8 cm. The ice slurry input through inlet 32 travels inside housing 23 from input end 24 and, after consolidation of the ice slurry into the ice bed in ice filter 18, as an ice bed toward output end 26 by sliding over filter plate 28. Between input end 24 and output end 26, the ice slurry and ice bed are filtered to produce a clean ice product. Filter plate 28 is separated from top plate 30 by a spacer 34 such that a distance between a lower surface of top plate 30 and top surface of filter plate 28 defines the height or thickness of the ice slurry as it moves through the filter 16. The lower surface of top plate 30 is the top boundary of the channel through which the ice slurry and ice bed are formed and transported. The ice bed is slightly lower than the lower surface of top plate 30 due to slight melting. The height of the channel can be varied by adding plates to the bottom surface of top plate 30 which fit between the sides formed by spacer 34.

The thickness of the ice bed in filter 16 should not be too large because rinsing difficulties increase with thickness. Alternatively, the thickness of the ice bed in filter 16 should not be too small because the ice bed must be mechanically strong enough to be driven through rinsing filter 20 without breaking and jamming the slots in filter plate 28. For example, ice beds thinner than 0.63 cm are insufficiently rigid to withstand the compression created by the ice driving pump 14 and the clamping suction applied through filter plate 28 by vacuum pump 22.

Top plate 30 covers only the upstream half of filter 16, which includes the first four rows of slots 40, as shown in FIG. 2. Another embodiment of the top plate (not shown) covers the entire filter 16. Below filter plate 28 is a drain plate 36 and drainage boxes 38 for receiving the liquid filtered out of the ice slurry and ice bed passing through filter 16.

Filter plate 28 includes eight rows extending along a longitudinal length of filter plate 28 from input end 24 to output end 26. Each row includes fifteen or sixteen thin slots extending parallel to the longitudinal axis of filter plate 28. The rows of thin slots include a first set of rows of slots 40 at ice filter 18 and a second set of rows of slots 42 at rinsing filter 20. The first set 40 includes four rows 51, 52, 53 and 54 each including a plurality of slots 51', 52', 53' and 54'. Similarly, the second set 40 includes four rows 61, 62, 63 and 64 each including a plurality of slots 61', 62', 63' and 64'. The rows are offset 3.2 mm from the immediately preceding row in that set. The thin slots are sufficient to allow liquid filtered from the ice slurry to pass therethrough. For example, each slot is 5.08 cm long and 0.25 mm wide. Although two sets of four rows of four slots are shown, the invention is not limited to this configuration. For example, the sets of rows and slots may be contiguous and/or the quantity and placement of the rows and slots may be varied according to particular requirements.

The first set of rows of slots in filter 18 are each coupled to a low suction pump 21. Low suction pump 21 may comprise a peristaltic tubing pump with a maximum pumping rate of 8 liter/min. This pump serves to draw the liquid from the ice slurry. Accordingly, the ice slurry is consolidated into the ice bed as discussed earlier.

A filtered feedwater rinse sprayer 44 is positioned slightly upstream from rinsing filter 20 such that filtered feedwater can be sprayed on the ice bed passing out of ice filter 18 and into rinsing filter 20. For example, rinse water is sprayed onto the top of the ice bed from a single fan, low flow (nominal 7 l/h) spray nozzle mounted at output 26 of top plate 30. The height of the nozzle of sprayer 44 is adjusted so that the spray just spans the ice bed at the selected rinse water flow rate. Vacuum pump 22 (shown in FIG. 1) is positioned to draw the rinse liquid and substantially all of the remaining liquid remaining in the finer pores of the consolidated ice slurry therethrough. Vacuum pump 22 may also be used alone to suck remaining liquid from the ice bed.

As an alternative to sprayer 44 or in combination with sprayer 44, filter plate 28 may be heated to slightly melt the consolidated ice slurry passing through rinsing filter 20, thereby enabling rinsing from the ice bed substantially all of the remaining liquid. Filter plate 28 should be heated to a temperature just above freezing. By heating filter plate 28 at rinsing filter 20, a thin portion of the lower side of the ice block can also be melted, which is where higher concentrations of the saline are generally found.

Moreover, by heating filter plate 28, ice, which will otherwise build up in and clog the slots of filter plate 28, is melted so that the slots remain free and clear of any build up. As a result, the frictional resistance otherwise created by such a buildup in the slots is eliminated. Additionally, by introducing this thin liquid layer between the ice bed and filter plate 28, the ice bed glides over filter plate 28.

Jamming of the slots in filter plate 28 with ice may be minimized, for example, by heating filter plate 28. A water stream running through a channel in an acrylic plate clamped to the bottom of filter plate 28 is an effective heating means. The rows of slots in rinsing filter 20 and the last row of slots in ice filter 18 are particularly susceptible to ice jamming when filter plate 28 is not heated. The water stream is heated by a steam heated heat exchanger and held at a steady inlet temperature ±1° C. in the 50°–60° C. range, at a flow rate of approximately 3.8 liters/min. Melting of the ice particles trapped in the slots of filter plate 28 provides an alternative to intermittent back flushing of the slots.

Suction for the rows of slots in rinsing filter 20 is provided by pump 22, which has a suction greater than the suction of pump 21. Pump 22 may comprise a vacuum tank held between 50 and 80 kilo Pascals (kPa) by two mechanical vacuum pumps (2.6 kW, nominally 2.2 m³/min). Suction to any of the rows of slots in rinsing filter 20 can be controlled with butterfly valves on the hoses between the slots and the vacuum tank. Measurements with a flowmeter show that air flow to the vacuum tank, F, is directly proportional to the steady indicated pressure in the tank $P_i$ in air with equation (1):

$$\begin{aligned} F &= [P_i/P_0]F_0 \\ &= 0.96[P_i/P_0] - .06 \end{aligned}$$

where $F$ and $F_0$ are in m³/min and $P_0$ is atmospheric pressure.

Figure 3:
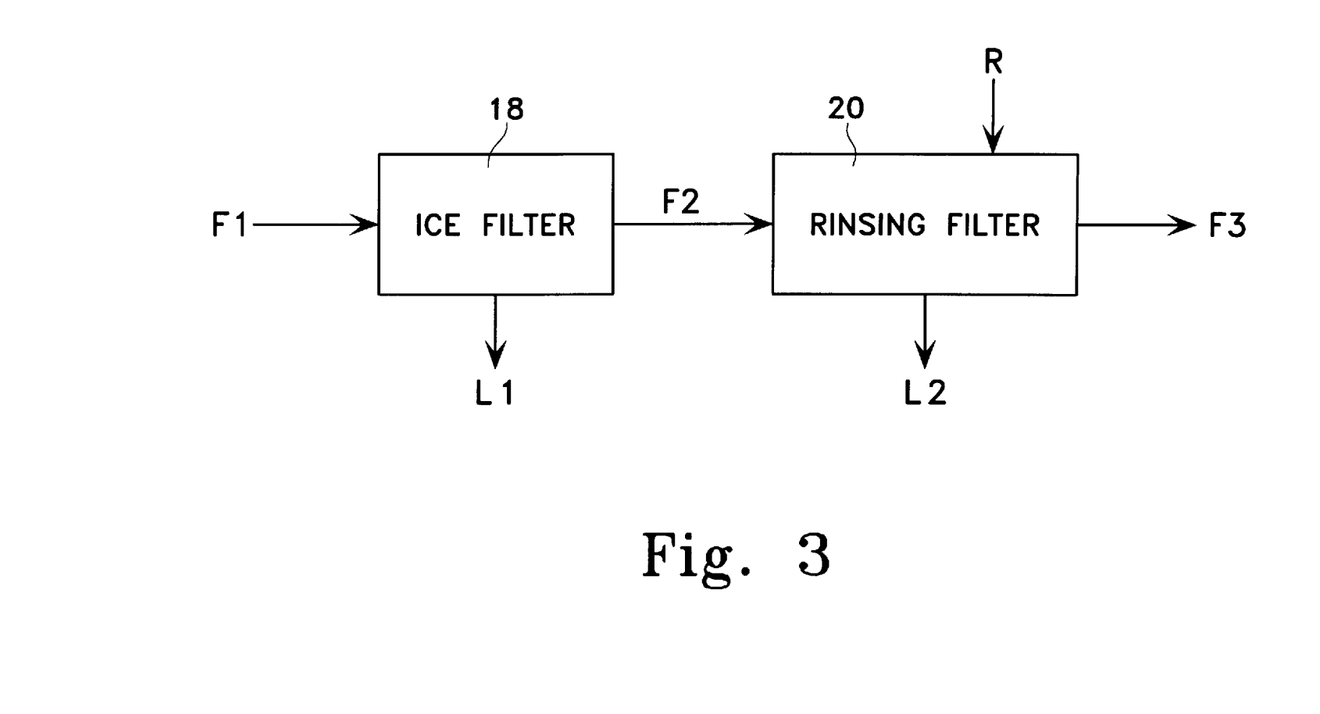
FIG. 3 shows a flow chart corresponding to FIG. 1.

FIG. 3 is a schematic diagram which represents the process or method of the invention. F1 is the ice slurry from freezer 12, F2 is the ice bed from which liquid has been filtered in ice filter 18, and F3 is the final ice product after the ice bed has passed through rinsing filter 20. L1 is the liquid that is removed from the ice slurry at ice filter 18 and L2 is the remaining liquid that is removed from the ice bed in rinsing filter 20. R is the filtered feed water rinse, which can be sprayed water, melted ice particles from bed heating, or both. Mass and solute balances can be made over sections of the filtration process to provide calculated flow rate values for F2 and L2, for example, which cannot be easily measured. For example, $$F2 = F1 - L1$$

$$L2=(L2)/(F3_{liq})[F1_{liq}-L1-F3_{liq}]$$

The subscript "liq" indicates that value is for only the liquid part of the ice slurry or ice bed. The subscript "ice" indicates that the value is for only the ice part of the ice slurry or ice bed.

Figure 6:
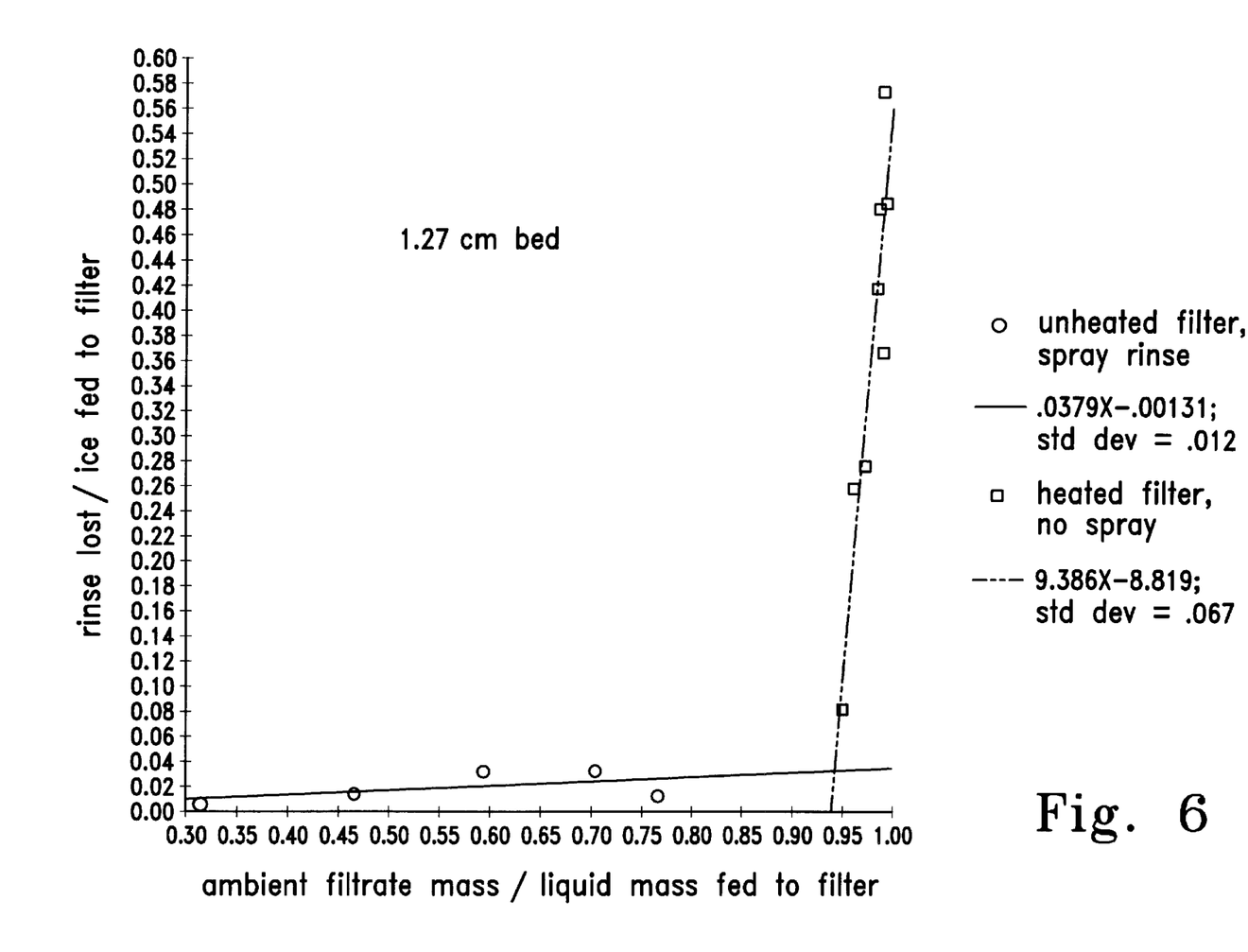
FIG. 6 shows a graph illustrating a vacuum filtration rate of liquid fed to a vacuum section versus fractional ice loss.
Figure 7:
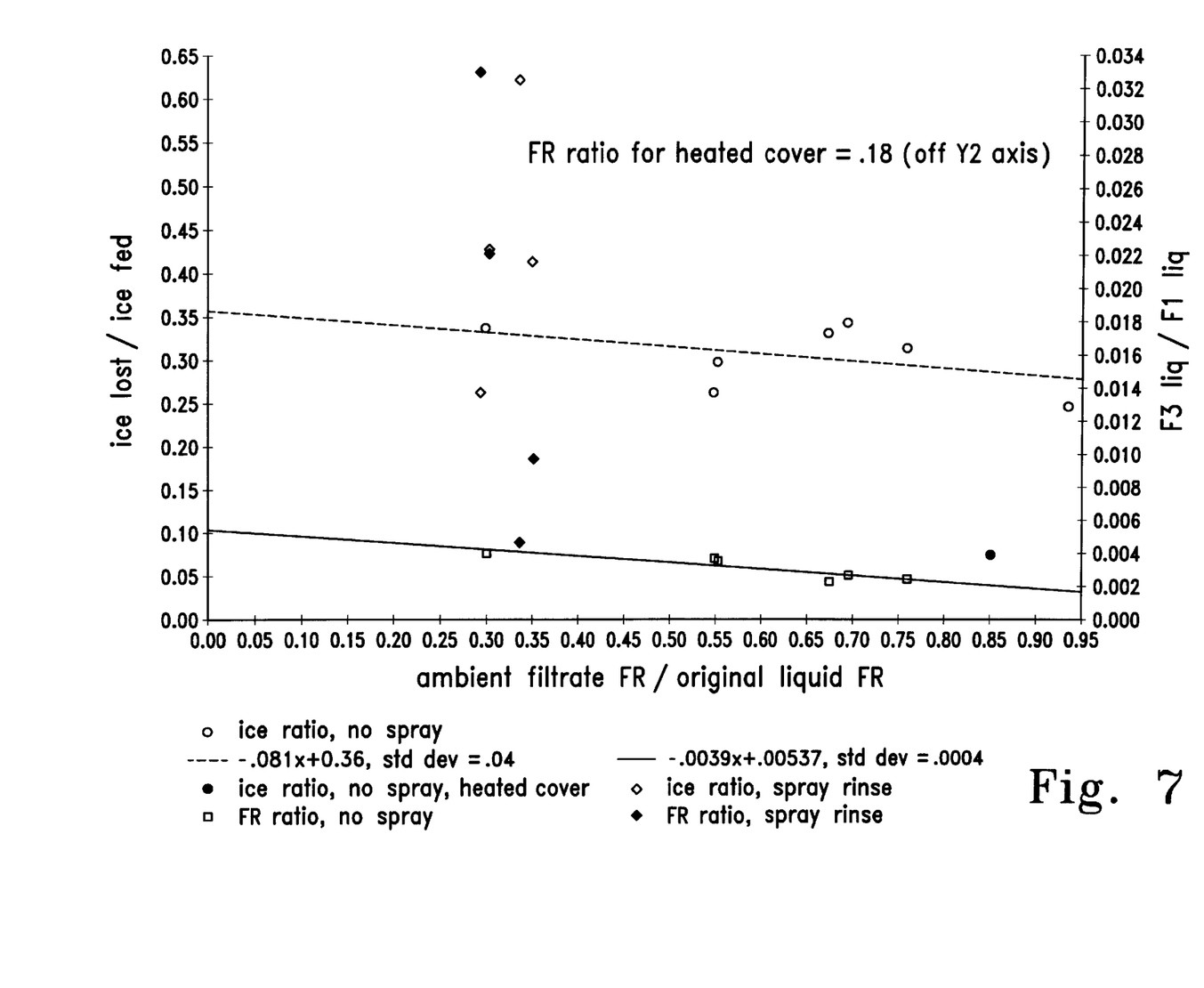
FIG. 7 shows a graph illustrating a fractional ice loss and vacuum filtrate fraction verses ambient pressure filtration fraction.

The effectiveness of rinsing filter 20 can be described in terms of the relationship between the ability of rinsing filter 20 to separate the liquid in the ice bed that is fed into it and the cost, as measured by the amount of ice lost or melted during rinsing in rinsing filter 20. FIG. 6 shows a linear fit of liquid fraction removal ($L2/(L2+F3_{liq})$) measurements along the x axis and ice loss ($F2_{ice}+R-F3_{ice})/(F2_{ice}+R)$) measurements along the y axis. The liquid fraction removed was calculated from the liquid drawn through rinsing filter 20 and the liquid left in the final ice product (F3). The fraction of product ice loss is: the ice in the ice bed (F2) fed into rinsing filter 20 plus the rinse water (R) used, less the ice in the final ice product (F3). A final ice product rate is calculated by subtracting the weight of a liquid stream at a concentration equal to the concentration of the filtrate L1 from the product ice weight. The dependence of the ratios shown in FIG. 6 on the ambient filtrate fraction of the fed liquid ($L1/F1_{liq}$) on ice filter 18 is shown by the graph in FIG. 7. The curves in FIG. 7 show results for 0.95 cm thick ice beds, indicating that increasing the amount of liquid initially removed at ice filter 18 is advantageous when spraying of rinse water is not used. Spraying severely limits the fraction of liquid that can be removed by ambient filtration.

Filtration parameters, particularly those descriptive of the free liquid ambient filtration, have an influence on the effectiveness of rinsing. Slurry particles will consolidate as liquid is withdrawn, and form a fixed bed at the maximum packing fraction, which is the fraction of the bed volume filled with solid (ice) particles. A generalized equation relating the suspension medium viscosity and the suspending medium viscosity with suspension particle volume fraction includes a maximum particle packing fraction (as discussed in Sudduth, R. D. 1993. *J. Appl. Polymer Sci.* vol. 48, pp. 42–50). For fairly uniform particles, this maximum fraction is somewhere above 0.64. It is also known that in some circumstances flowing suspensions will generate a particle structure (as discussed in Hoffman, R. L. 1991. *MRS Bulletin.* vol. 16, pp. 32–27). When the volume fraction of solid particles is above a certain value, i.e. about 0.16, some structuring of the particles is expected from percolation theory (as discussed in Campbell, G. A. and Forgacs, G. 1990. *Physical Review A.* vol. 41, pp. 4570–4573). These known relations suggest that the parameters of the drainage process that control the structure and which may affect the permeability of the consolidated bed, can be identified. Without rinsing, saline ice slurries typically can be filtered down to about 0.45 weight fraction ice; rinsing back pressure reduces the initial free liquid filtration (and solid content of the ice moving through the filter to the rinsing section) to about 0.25 weight fraction ice. Ice filtration improves with reduced ice feed rate, presumably due to an increase in residence time of the ice bed in the filtration zone allowing the liquid in finer pores more time to be rinsed into the percolation network formed from the larger pores. A certain, very small amount of solute is trapped within ice particles formed by the coalescing of ice crystals during their pumped compression. This solute is the unremovable solute in the product water.

Spraying clean water on the top of the ice bed to rinse the consolidated ice has a low net production cost as long as only a small amount of the rinse water is sucked out through the slots. If the rinse water moves slowly through the ice bed and does not mix with the residual salt solution it can freeze in the bed. Ideally the rinse front will just reach the base plate after displacing the salt solution to the bottom of the bed. A design objective for rinsing a porous bed is thus to create a sharp rinsing front that reaches the row of slots as the ice bed reaches the slots. The sharp rinsing front means an extreme difference in concentration between the rinse and the liquid in the ice bed, such as is created by using pure water as the rinse that will displace the saline remaining in the ice bed. Ice filtration has the unusual feature that the rinse water will solidify if it goes through the bed slowly. The tendency for this to occur increases with ice particle size (and resulting bed pores) and filtration rate. When the rinse water is unevenly distributed, feebly rinsed portions of the bed will become sealed off by frozen rinse water, forming practically unrinseable conglomerates.

The bed must be thick enough to overcome the buckling shear stress that results from the braking action of the suction boxes and the hydraulic force driving the bed through the channel. Tests with coverage of only the upstream half of the bed showed that beds 0.635 cm thick were marginally rigid enough for filtration, since they would fold sporadically at the end of the covered section of channel. When the ice bed is thick enough, the drag created by the drainage slot suction is overcome by the feed force as the slurry feed pressure rises to a sufficient level. When there is resistance to solid motion in the channel, the slurry feed pressure rises to match it. With no suction at the slots, the pressure is less than 3.4 kPa, but rises to measurable levels as the valves below the vacuum boxes are opened to allow significant amounts of liquid to flow through the slots. By heating the slotted plate over which the ice bed passes, there is no measurable resistance of the ice motion from the channel per se, without flow through the slots. However, there is resistance due to a suction of the ice bed against the plate by the flow of air and/or liquid filtrate through the bed in the downstream section. The force driving the bed is equal to the product of the bed cross section and the upstream pressure. For typical runs this was measured to be 10–11 kPa. Resistance to ice motion is also evident in the measured slurry flow rate to the filter; rates will drop as much as 10% due to incipient slot occlusion which in turn is seen from a decrease in vacuum tank pressure (since there is a reduced flow of air and saline into the tank).

Figure 5:
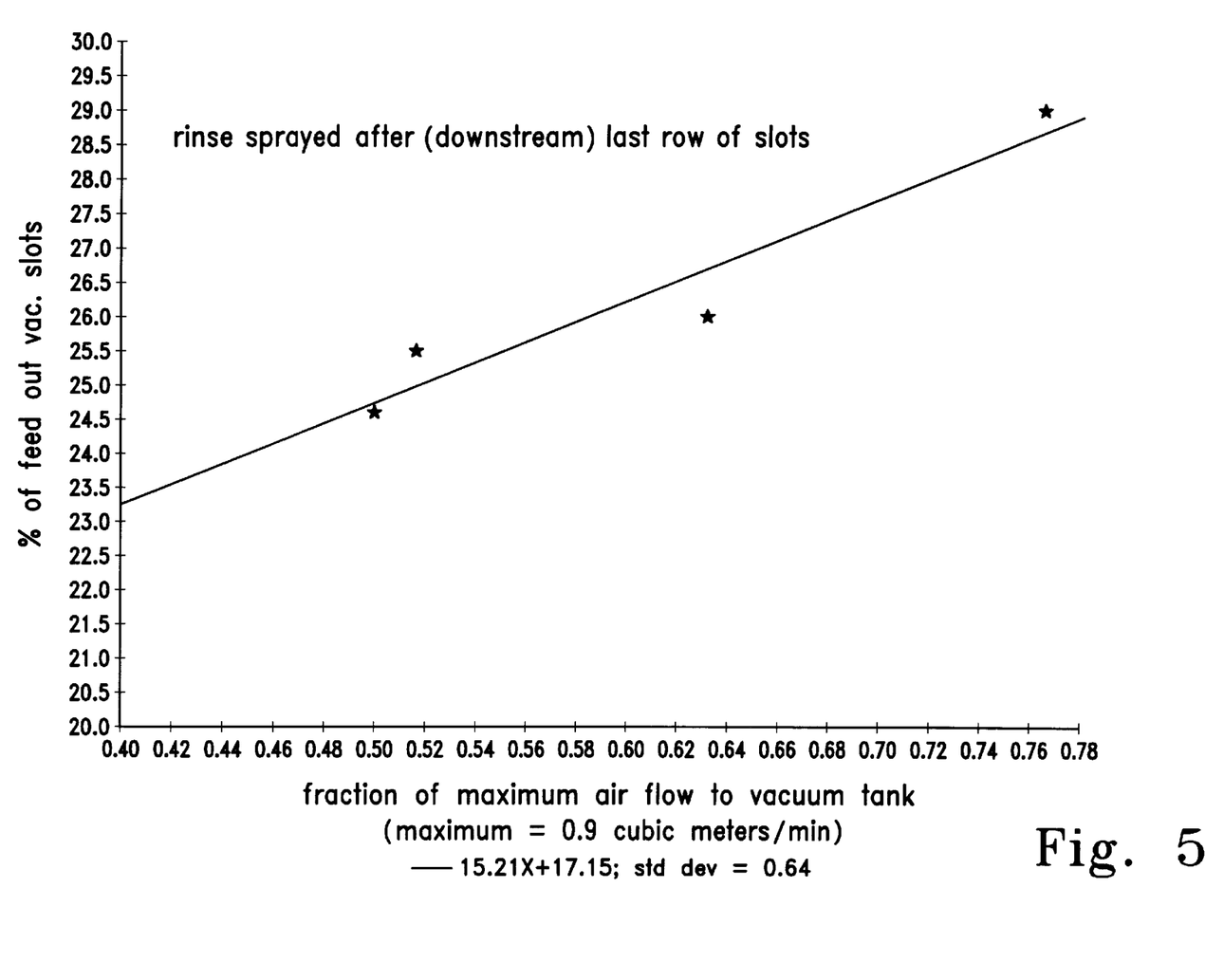
FIG. 5 shows a graph illustrating a vacuum liquid filtration rate versus air flow rate in accordance with the present invention.

In order that the rinse water displaces nearly all of the remaining saline solution from the ice bed but does not leave the filter with the rinse water remaining in the ice bed, it is preferable to spray the rinse water at the outlet end of the filter. It has been shown that this technique results in less salt in the product ice than the partly covered configuration with the rinse application at various locations above the vacuum slots. As shown in the FIG. 5, the calculated rate of liquid withdrawn through the rows of vacuum slots is roughly proportional to the air flow through the ice, for the range plotted, indicating a conservative use of the vacuum equipment. Although vacuum equipment is expensive, it is necessary to get acceptable ice purity with this concept for producing potable water. Rinsing is also necessary, but the equipment is less costly.

Of the salt solution that remains in the ice bed discharged from ice filter 18, approximately 90% of this remaining salt solution in the ice bed can be removed with an ice loss of 5% or less at rinsing filter 20. Removing the last 5% of the remaining salt solution is much more costly in terms of production and to obtain pure ice could require a 60% loss of product ice, which would make the process impractical.

In addition, melting some of the ice in rinsing filter 20 is preferable to spraying pure water from sprayer 44 as a rinse in rinsing filter 20. By melting, it is easier to distribute the melt uniformly across the width of the ice bed and thereby effectively rinse the ice bed, while using less pure water. Both melting and rinsing in rinsing filter 20 are necessary to obtain the purest ice product.

EXAMPLES

Experiments were conducted with a filter designed to provide a 1.27 cm channel height between the bottom surface of the top plate and the top surface of the filter plate. This thickness was reduced in 0.32 cm increments in order to study ice beds measuring ½ and ¾ of the standard thickness. Initial tests with these thicknesses indicated the possibility of improved performance with bed thickness >1.27 cm, therefore a 2.54 cm spacer was made to provide a channel of that height. Table 1 shows the results of using different channel heights and illustrates the effect of ice bed thickness on projected production rate of pure ice.

TABLE I

| Bed Thickness (cm) | Production Rate (kg/hr) |
| --- | --- |
| 2.54 | 32 |
| 1.27 | 45 |
| 0.95 | 28 |
| 0.63 | 43 |

The production rates were determined by extrapolating the linear ice production rate versus ice purity plots to pure ice (zero NaCl content). Later test runs, all made with 0.95 or 1.27 cm bed thicknesses showed a reduced NaCl content/production rate slope for operation under conditions producing low NaCl content. Several runs with the heated filter using a 0.95 cm spacing are shown along with an unheated filter curve in FIG. 4.

Establishing a steady ice content in the product stream usually took about an hour after starting the freezing process. The product slurry flowed through the filter and cooled to the operating temperature during this period. The ice content of the product stream was determined using an in-line densitometer in a loop formed using two automatic valves that divert a slurry sample to the meter every 7 minutes and that melts a slurry sample while recirculating it through every 7 seconds.

As an alternative to rinsing, the cover plate and spacer bar between plates were heated by spraying 75 kg/h of ambient temperature water on top of the last half of the cover plate. This increased ice melting and reduced the flow resistance of the ice bed as indicated by slurry feed pressure but consumed an impractically high fraction of ice. The resistance reduction was primarily attributed to the melting of ice jammed in the corners between the spacers and baseplate.

The experimentation showed the following results. Slurries were formed from NaCl solution feeds in the range of 1.9 to 2.2% of NaCl at a rate of 45 Kg/h. The slurry ice content was controlled in the range of 8% to 20% of NaCl, as determined from the slurry density measurement. The ice crystals were suspended in a liquid of 2 to 3% of NaCl. The ice content decreased during a run but not enough to affect the filtration significantly.

Figure 4:
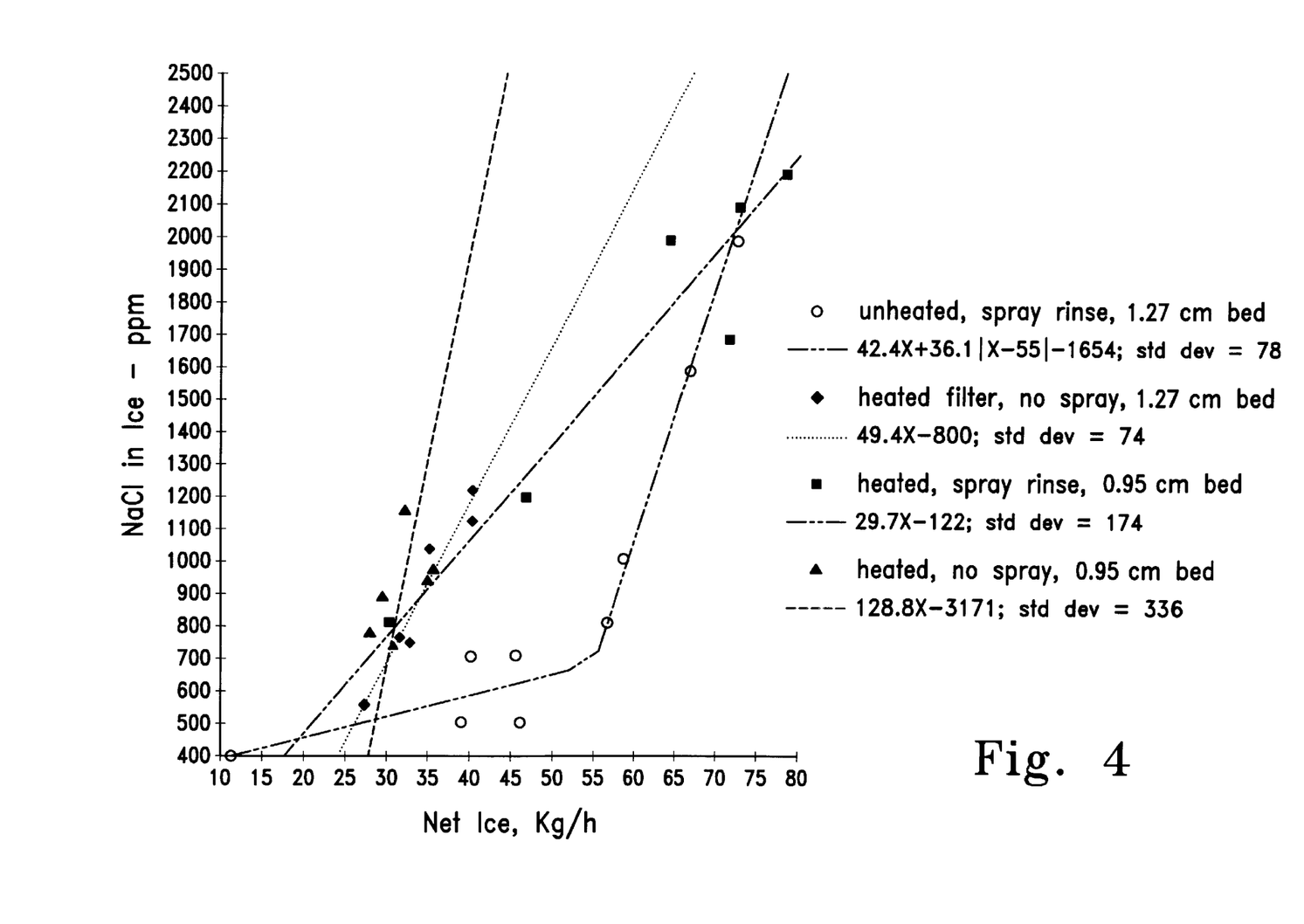
FIG. 4 shows a graph illustrating ice purity versus production rate in accordance with the present invention.

The right hand leg of the unheated filter curve in FIG. 4, shows that the ice purity is inversely related to net ice production. This is consistent with the effects of the optional alternatives to the basic operating procedure which improve purity, i.e. spraying water, heating the base, or operating at a lower initial ice production rate. These steps all reduce production rate. The ice slurry fed to the filter was kept at a constant rate, at near the maximum the freezer could supply for a given salt concentration. The unheated filter curve in FIG. 4 shows the lowered salt content due to rinsing at the higher ice yields (about 1 mass unit of salt solution at its original concentration removed per 3.5 units of rinse water lost) and a lesser effect at lower yields, as the additional sprayed rinse water removes less salt solution (the ratio of rinse to residual solution used becomes 44:1).

While various embodiments of the invention have been described above, it is understood that they have been presented by way of example only, and not limitation. For example, it is within the scope of the invention to filter a variety of types of low viscosity input feed stream into and through the described filters. Thus, the breadth and scope of the invention should not be limited by any of the above-described exemplary embodiments, but should be defined in accordance with the following claims and their equivalents.

We claim:

1. A filtration system for filtering liquid from an ice slurry to produce clean water, comprising:

a housing having a feed inlet for introducing the ice slurry into said housing at a first end of said housing and an outlet at a second end of said housing opposite to said first end;

a filter plate disposed in said housing and extending from said first end of said housing to said second end of said housing, said filter plate having a first portion with a first set of slots, a second portion with a second set of slots, a top and a bottom, wherein said ice slurry is positioned adjacent to said top of said filter plate;

a first pump having a first suction disposed at said first portion of said filter plate adjacent said bottom of said filter plate, wherein said first pump induces a first flow path through said first set of slots from said top of said filter plate to said bottom of said filter plate; and a second pump having a second suction greater than said first suction disposed at said second portion of said filter plate for inducing a second flow path through said second set of slots from said top of said filter plate to said bottom of said filter plate.

2. A filtration system according to claim 1, further comprising:

a sprayer for spraying liquid in the vicinity of said second portion of said filter plate.

3. A filtration system according to claim 1, further comprising:

a heater for heating said second portion of said filter plate.

4. A filtration system according to claim 1, wherein said first and second sets of slots are formed in rows on said filter plate and said slots extend longitudinally along said filter plate.

5. A filtration system according to claim 1, wherein said housing includes a top plate disposed parallel to and spaced apart from said filter plate, wherein a distance between said top plate and said filter plate substantially determines the thickness of said ice slurry as the ice slurry moves through the filtration system.

6. A filtration system according to claim 1, wherein said filter plate is disposed horizontally.

7. A filtration system according to claim 1, wherein said housing is elongated.

8. A filtration system for filtering liquid from an ice slurry to produce clean water, comprising:

means for inputting a liquid-ice slurry from a freezer into a stationary filter;

first means for filtering a portion of said liquid from said liquid ice slurry, thereby forming an ice bed;

means for producing a liquid rinse for rinsing said ice bed; and second means for filtering from said ice bed substantially all liquid remaining in said ice bed.

9. A filtration system according to claim 8, wherein said means for producing a liquid rinse comprises:

means for heating said ice bed, wherein a portion of said ice bed melts to form said liquid rinse.

10. A filtration system according to claim 8, wherein said means for producing a liquid rinse comprises:

means for spraying said liquid rinse on said ice bed.

11. A filtration system according to claim 8, wherein said second means for filtering substantially all of said remaining liquid from said ice bed comprises:

means for drawing substantially all of said remaining liquid from said ice bed with a vacuum pump.

12. A filtration system according to claim 8, wherein said first means for filtering said first portion of liquid from said ice slurry comprises:

means for drawing said first portion of said liquid from said ice bed with a low suction pump.

13. A filtration system according to claim 8, wherein said first means for filtering said first portion of liquid from said ice slurry comprises:

means for drawing said first portion of said liquid from said ice bed under ambient pressure.

14. A method for continuously filtering a liquid from an ice slurry to produce clean water, comprising the steps of:

inputting a liquid-ice slurry from a freezer into a stationary filter comprising a first filter and a second filter;

filtering a portion of said liquid from said ice slurry by passing said ice slurry through said first filter, thereby forming an ice bed;

rinsing said ice bed; and filtering from said ice bed substantially all of said liquid remaining in said ice bed by passing said ice bed through said second filter.

15. A method according to claim 14, further comprises the step of:

heating said ice bed to melt a portion of said ice bed while passing said ice bed through said second filter.

16. A method according to claim 14, wherein said step of rinsing comprises the step of:

spraying said ice bed with a liquid.

17. A method according to claim 14, wherein said step of filtering from said ice bed substantially all of said liquid remaining in said ice bed comprises the step of:

drawing substantially all of said liquid remaining in said ice bed out of said ice bed with a vacuum pump.

18. A method according to claim 14, wherein said step of filtering said first portion of liquid from said ice slurry comprises the step of:

drawing said first portion of said liquid from said ice bed with a low suction pump.

19. A method according to claim 14, wherein said step of filtering said first portion of liquid from said ice slurry comprises the step of:

drawing said first portion of said liquid from said ice bed under ambient pressure.

* * * * *